Figure 1:
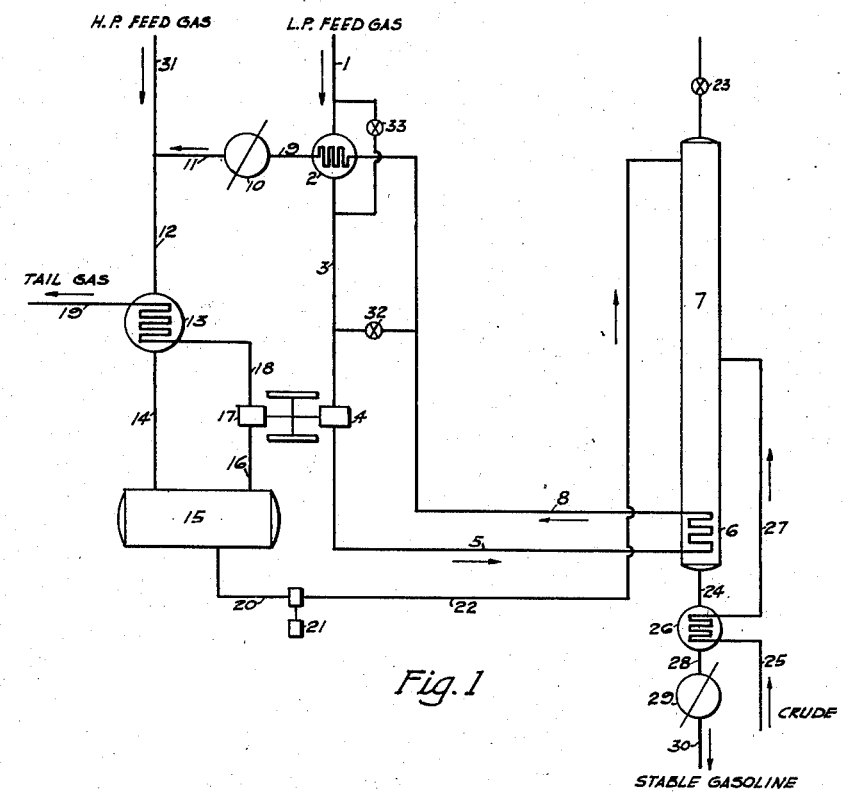

Nov. 1, 1938.   O. C. BREWSTER   2,134,700
SEPARATION OF HYDROCARBONS
Filed Sept. 29, 1936

INVENTOR
Oswald C. Brewster
BY Kenyon & Kenyon
ATTORNEYS.

Patented Nov. 1, 1938

2,134,700

UNITED STATES PATENT OFFICE 2,134,700

SEPARATION OF HYDROCARBONS

Oswald C. Brewster, Litchfield, Conn., assignor to Refinery Engineers, Inc., New York, N. Y., a corporation of Missouri Application September 29, 1936, Serial No. 103,122

19 Claims. (Cl. 62—175.5)

This invention relates to the separation of liquefiable constituents from hydrocarbon gases and more particularly to a method for recovering the components of the natural gas falling within the motor fuel boiling range whereby the energy of the gas due to its pressure as it comes from the separator at the oil or gas well is utilized to carry out the steps of the process.

In the production of crude petroleum from wells the relatively heavy crude often has associated with it large amounts of hydrocarbon gases, consisting of methane, ethane, propane, and butanes, and their corresponding homologues of the ethylene series. In order to produce the oil it is also necessary to permit the gas to flow from the well. Particularly is this so in the case of so-called "flush" production where a new oil field has been brought in and the wells are under heavy gas pressure, often ranging upwards of a thousand pounds per square inch. The common practice in producing oil from such wells is to allow the gas and crude to flow from the well, often through a pressure reducing orifice, or "choke", to a separating tank wherein the gas and oil are permitted to separate so that they may be drawn off as liquid and gaseous streams. The oil is conducted to tanks carried at atmospheric pressure where it may be gauged and from which it may be pumped into the gathering system for ultimate delivery to a refinery. The gas from the separator may pass into a line conducting it to a gasoline recovery plant, or into a fuel gas gathering system, or it may be blown to the air, usually being burned at a torch, when there is no other demand for it. Many billions of cubic feet of gas are thus burned annually. While the lighter hydrocarbon content of this gas may represent little value, there is invariably present in the gas appreciable quantities of valuable recoverable gasoline, consisting of hydrocarbons containing four, five, and six or more carbon atoms per molecule. These constituents of the gas are present in vapor form in amounts corresponding to their equilibrium partial pressures in the crude oil under the temperature and pressure conditions existing in the separator. Higher separator pressures tend to reduce the amount of heavier hydrocarbons in the gas and lower pressures tend to increase the amount. When, however, high pressures are used in the separator, substantial amounts of gas remain absorbed in the crude and this gas is released when the crude is run to the flow tanks, and since the pressure here is substantially atmospheric, the gas so released contains large quantities of the more valuable hydrocarbons. Thus the attempt is usually made so to balance the separator pressure that the total loss of valuable components is a minimum. In spite of this the losses thus suffered are commonly of considerable magnitude. The recoverable gasoline contained in the "wet" gas from the separator may amount to from one half gallon or less to several gallons per thousand cubic feet of gas and the gas released from a single well often amounts to several million cubic feet per day. In addition, the amount of valuable components released from the crude at the flow tanks is of substantial proportions. While much of this lost product could be recovered by well known means it is not usually considered profitable to do so until an oil field is in more or less settled production after the gas pressure has been reduced by depletion. This is largely due to the fact that the equipment necessary to carry out this recovery process has heretofore been of an elaborate and costly character and cannot economically be installed to handle the large quantities of relatively lean gas available under flush conditions.

Moreover, with the recent advances made in the technology of gas polymerization, propane and propylene have assumed a new importance and value as feed stock for this process. In the past only a negligible effort has been made to recover these materials as well as a large amount of butanes and butylenes which are in excess, as such, for direct use as motor fuel but which may be converted, by polymerization, to high quality gasoline.

In a copending application Serial Number 103,121 filed September 29, 1936, a novel method for recovering the liquefiable components of wet natural gas has been fully disclosed. The method disclosed therein comprises expanding gas, which has been stripped of its liquefiable components, through an engine thereby performing work and substantially lowering the temperature of the gas according to well known principles of thermodynamics. The cold expanded gas is then used as the cooling medium for cooling the incoming wet gas, which enters the system under substantial pressure, and the liquefiable components of the gas are condensed and collected as "wild" condensate, the unliquefied portion passing to the engine to be expanded and cooled. The work performed by the engine is converted into heat energy and at least a part of this heat is used to furnish the heat required to stabilize the wild condensate to produce a stable motor fuel product. Thus the pressure energy of the incoming fresh wet gas is utilized to provide refrigeration for cooling and partially condensing the wet gas and to provide heat for stabilizing the condensate.

It is an object of this invention to provide a more efficient and economical method and apparatus for recovering liquid hydrocarbons from a mixture of the vapors thereof with the vapors or gases of more volatile hydrocarbons.

A feature of this invention is that, in recovering liquid hydrocarbons from a mixture of the vapors thereof with the vapors or gases of more volatile hydrocarbons in an operation in which the gases or vapors are expanded with consequent reduction of temperature and partial condensation and that reduction of temperature is utilized to cool the gas prior to said expansion, the feed gas or a portion thereof is compressed prior to the expanding thereof to a pressure higher than that at which it is originally available. As a result of such compression of feed gas, a greater quantity of the higher boiling components of such gas is obtainable in and as the desired liquid hydrocarbon product upon subsequent expansion of the gas. By effecting compression of feed gas prior to expansion thereof, the expansion ratio is increased and a correspondingly greater refrigerating effect, useful in the process, is obtained by its expansion. By effecting compression of the feed gas prior to expansion, the temperature to which the gas must be cooled to produce a given quantity of condensate is materially higher than the temperature necessary to produce the same quantity of condensate without such compression, and the condensate will contain a larger proportion of higher boiling components of the gas than would a similar amount of condensate produced without such compression and at a lower temperature; or a greater yield of total condensate may be obtained at such lower temperature with prior compression of the feed gas than would be obtained if such prior compression were not effected. Not only does the prior compression of the feed gas result in a greater yield at a given temperature or the same yield at a higher temperature, but it also facilitates the obtaining of the desired temperature since the refrigerating effect of the expanding gas is increased by its prior compression. Further features of this invention are that the energy derived from the expansion of the gas may be utilized to effect compression of the feed gas prior to its expansion; that the rise of temperature resulting from the compression may be utilized in stabilizing the condensate formed by the cooling; and that additional wet gas available at a pressure similar to that to which the original gas is compressed can be taken into the system with the compressed gas and expanded therewith. When gas is available at the compression pressure the invention may be contemplated as an operation in which the energy of the high pressure feed gas is utilized to raise the pressure of the low pressure feed gas; and in such case the two bodies of gas may be expanded together.

The several features of this invention which are herein described may be separately employed or combined one with another or with other operations directed to similar ends.

Figure 2:
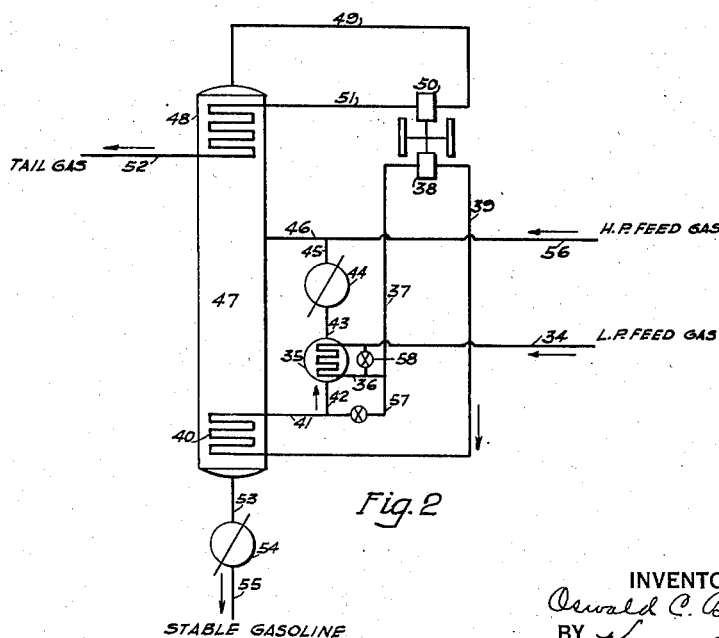

The operation of the invention will be fully understood from the following description taken in connection with the accompanying drawing in which Figure 1 represents diagrammatically apparatus for practicing the invention and Figure 2 represents a modified form of apparatus for practicing the invention.

Referring to Figure 1, wet feed gas under substantial pressure enters the system through pipe 1 and passes through heat exchanger 2 wherein it is heated by heat exchange with warm gas. The warmed feed gas passes from heat exchanger 2 through pipe 3 to compressor 4 wherein it is compressed to a higher pressure and, in being compressed, is further heated. From compressor 4 the heated compressed gas is discharged into pipe 5 and passes through coil 6 where it imparts a portion of its heat to condensate being stabilized in stabilizer 7. From coil 6 the gas passes through pipe 8 to heat exchanger 2 wherein it is partially cooled by incoming wet gas, thence through pipe 9 to cooler 10 where it is further cooled by any desired available cooling medium, as, for example, air or water. From cooler 10, the gas passes through pipes 11 and 12 to heat exchanger 13 wherein it passes in indirect heat exchange relationship with cold dry gas and is cooled thereby and its higher boiling constituents are liquefied. The chilled mixture of gas and condensate passes from heat exchanger 13 through pipe 14 to separator 15 wherein the condensate separates from the gaseous portion. The dry gas thus separated passes from separator 15 through pipe 16 to engine 17 wherein the gas expands and performs mechanical work, driving compressor 4, and in so expanding is substantially cooled. The cold gas exhausts from engine 17 at reduced pressure into pipe 18 and passes through heat exchanger 13 wherein it serves as the cooling and condensing medium for the wet gas as described. From heat exchanger 13 the dry gas passes through pipe 19 to be burned at a torch or otherwise disposed of as desired.

"Wild" condensate collected in separator 15 is withdrawn therefrom through pipe 20 by pump 21 and discharged through pipe 22 to stabilizer 7. The condensate in passing through stabilizer 7 is fractionated in the well known manner, undesirable low boiling constituents being vaporized and passing off as gas through valve controlled pipe 23. The stabilized motor fuel produced is withdrawn from the bottom of stabilizer 7 through pipe 24. The heat required for the stabilizing operation is supplied by heating coil 6 as already described.

As is fully explained in the copending application already cited, under certain conditions it may be desirable to stabilize crude oil produced with and separated from the gas, or otherwise obtained, in mixture with the recovered condensate. In this case crude oil may be introduced through pipe 25 into heat exchanger 26, passing in heat exchange with hot stable product from the bottom of stabilizer 7, the raw crude being warmed thereby and the stable mixture of crude and recovered condensate being cooled. Warmed fresh crude from heat exchanger 26 passes through pipe 27 into stabilizer 7 as shown. The stable product passes from stabilizer 7 by way of pipe 24 through heat exchanger 26, thence through pipe 28 to cooler 29 and from cooler 29 through pipe 30 to storage. When crude oil is not being stablized heat exchanger 26 may be eliminated and the stable product may pass directly from stabilizer 7 through cooler 29 to storage.

Under certain conditions as will be more fully explained hereinafter, part of the wet feed gas may be available at the pressure to which the compressor 4 compresses the incoming gas. Such gas may be admitted to the system through pipe 31, passing with the compressed gas through pipe 12 to heat exchanger 13. In this case power developed by engine 17 may be more than can be expended by compressor 4. To permit compressor 4 to expend the power delivered thereto a portion of the compressed gas in pipe 8 may be released through throttle controlled by-pass 32 back to the intake of compressor 4 as shown. The temperature attained by the compressed gas, and hence the heat delivered to stabilizer heating coil 6, may be regulated by by-passing controlled amounts of the wet feed gas around heat exchanger 2 through valve controlled by-pass 33.

Figure 2 represents a modified form of the invention wherein the condensation of the liquefiable constituents of the gas and the stabilization thereof are carried out in a unitary fractionating column. Wet gas under substantial pressure is introduced through pipe 34 into heat exchanger 35 wherein it is warmed by heat exchange with hot gas. The warmed wet gas from heat exchanger 35 passes through pipes 36 and 37 to compressor 38 where it is compressed to a higher pressure and thereby still further heated. The compressed heated gas is discharged from compressor 38 into pipe 39 through which it passes to heating coil 40 wherein it imparts a portion of its heat to condensate which is being stabilized, being itself partially cooled thereby. From coil 40 the gas passes through pipes 41 and 42 to heat exchanger 35 in which it is further cooled by heat exchange with incoming wet gas. From heat exchanger 35 the compressed gas passes through pipe 43 to cooler 44 where it is further cooled by heat exchange with any suitable cooling medium such as, for example, air or water. The cooled gas passes from cooler 44 through pipes 45 and 46 into fractionating column 47 at an intermediate point. The gas, mixed with rising vapor from the lower portion of column 47, rises countercurrently to a descending stream of reflux condensate in the usual manner of operation of such columns. In thus ascending the column a portion of the higher boiling components are absorbed from the gas by the descending reflux and some of the lower boiling components of the reflux are vaporized and join the ascending gas stream. Furthermore, the temperature of the rising gas stream is progressively lowered during its upward passage through the column. Further progress up column 47 brings the rising gas stream into contact with cooling coil 48 which substantially lowers the temperature of the gas and liquefies the remaining portions of the gas which are liquefiable under the temperature and pressure conditions existing, thus providing the reflux condensate flowing down column 47. Coil 48 may be located within the column proper as shown or may be located exterior to column 47 with provision for returning the reflux formed to the column as is often done in the operation of such columns. The gas, chilled and stripped of its higher boiling components passes through pipe 49 to engine 50 wherein it expands and performs mechanical work, driving compressor 38 and in so doing suffers a substantial reduction in temperature. The cold expanded gas exhausts from engine 50 at reduced pressure into pipe 51 which conducts it through coil 48 wherein it serves as the cooling medium for cooling the gas and condensing the reflux condensate as already described. The gas, now warmed by its absorption of heat in coil 48, passes therefrom into pipe 52 which conducts it to whatever disposal system is desired, as, for example, a torch or other means of utilizing the gas.

The reflux condensate descending column 47 below the point where the gas is introduced by pipe 46 is progressively warmed in its descent countercurrent to rising warm vapor and finally contacts heating coil 40 which raises it to the temperature required to stabilize it and reduce its vapor pressure to that required of the desired stable motor fuel. The stabilized product is withdrawn through pipe 53, cooler 54, and pipe 55 to storage.

As already described in connection with Figure 1, under certain conditions part of the wet feed gas may be available at a pressure equal to that to which the remainder of the gas is compressed in compressor 38. Such gas may be introduced into the system through pipe 56, mixing with compressed gas coming from cooler 44, and passing therewith through pipe 46 into column 47.

In order to permit compressor 38 to expend the power delivered to it by engine 50 a portion of the gas compressed may be by-passed back to the suction side of compressor 38 through valve controlled pipe 57 as shown. The temperature attained by the compressed gas, and hence the heat delivered to stabilizer coil 40, may be regulated by bypassing controlled amounts of the wet feed gas around heat exchanger 45 through valve controlled bypass 58.

In the operation of the invention the compression of the wet gas to a pressure higher than that at which it is available on entering is of great advantage. In order to liquefy the desired quantity of higher boiling components of the gas a lower temperature must be attained in the condensing zone when the pressure is low than when a higher pressure exists. For example, at a pressure of sixty pounds per square inch absolute it may require a temperature of −25 degrees Fahrenheit to condense substantially all of the pentane from a given gas, whereas at a pressure of 120 pounds absolute a temperature of only −10 degrees Fahrenheit is required and at atmospheric pressure almost −60 degrees Fahrenheit is needed for the same recovery. Furthermore, by increasing the pressure of the gas to be expanded in the engine the expansion ratio of the polytropic expansion therein is increased and a greater reduction of temperature of the gas on expansion is possible in accordance with well known thermodynamic principles. Thus, by increased pressure not only is the required temperature raised but the ease with which it is obtained is also increased since the refrigerating effect of the expanded gas is increased.

The amount by which the gas may be compressed depends on a number of conditions. It is apparent that the principal requirement which must be fulfilled is that the power delivered to the compressor by the engine is equal to the power required by the compressor in compressing the gas. Consideration of the fact that there are unavoidable power losses in the operation due to inefficiency of the engine and compressor, and due to frictional losses in pipes, exchangers and so forth will make it apparent that the degree to which the incoming gas is compressed is less than that by which the tail gas is expanded. The fact that the amount of tail gas available for power is less than the amount of incoming gas by the amount condensed, and that its temperature is lower than the incoming gas thus reducing its working volume also operates to reduce the amount by which the feed gas may be compressed. In general under practical operating conditions the compression ratio for the compression of the gas may be of the order of about one third to one half of the expansion ratio in the engine.

By way of example, wet gas enters a system such as is shown in Figure 1 at a pressure of 65 pounds per square inch absolute. It is heated to about 170 degrees Fahrenheit in exchanger 2 and reaches compressor 4 at a pressure of 60 pounds. Compressor 4 compresses the gas to about 125 pounds pressure and its temperature is raised to around 250 degrees Fahrenheit. The compression ratio is thus $$\frac{125}{60} = 2.08$$

The hot gas in giving up a part of its heat in stabilizer coil 6 is cooled to about 220 degrees Fahrenheit. It is further cooled to 100 degrees Fahrenheit in exchanger 2 and cooler 10 and is then cooled to around −10 degrees Fahrenheit in exchanger 13 where about 7% of the gas by volume is condensed. The dry gas at −10 degrees Fahrenheit and 110 pounds pressure passes to engine 17 wherein it expands down to about 20 pounds pressure, its temperature dropping to the neighborhood of −120 degrees Fahrenheit. The expansion ratio is thus $$\frac{110}{20} = 5.5$$

as compared a compression ratio of 2.08 when the gas was compressed. The cold gas at −120 degrees Fahrenheit serves as the cooling medium in exchanger 13 and is discharged at substantially atmospheric pressure at a torch where it is burned. The wild condensate from separator 15 is stabilized in stabilizer 7, operating at a temperature of about 200 degrees Fahrenheit at the bottom and 100 pounds pressure, the product being so-called natural gasoline having a Reid vapor pressure of about 26 pounds.

In this operation it is apparent that the gas entering the system at 65 pounds pressure supplies the energy required for the operation. Part of the energy expended upon the gas in compression is recovered on expansion through the engine but the net energy consumption of the system is that represented by the loss of energy of the gas in being reduced from its inlet pressure of 65 pounds to its outlet pressure of one atmosphere.

It often happens in the operation of an oil field that part of the gas may be released at relatively high pressures and part may be released at relatively low pressures. There is always a certain amount of rich gas released at the flow tanks at or near atmospheric pressure. Under these conditions it may be desirable to operate the process at such a pressure that the high pressure gas may be admitted to the system without being compressed, compressing only the low pressure gas. By this method the low pressure gas may be at any pressure and need contribute no energy to the system provided the energy of the high pressure gas is sufficient to provide the entire amount required. Under practical operating conditions, in the neighborhood of one volume of low pressure gas may be compressed from atmospheric pressure to the full operating pressure by two volumes of high pressure gas already available at full operating pressure. Any higher pressure at which the low pressure gas is received results in a higher ratio of low pressure gas volume to high pressure gas volume since at higher pressures some energy is available in the low pressure gas itself. In any event no difficulty is experienced in initiating the operation of the system, because the valves of compressor cylinders permit the gas first fed to pass through to the power end of the compressors.

As an example of operation under these conditions, operating as shown in Figure 1, about 1,700,000 cubic feet per day of wet gas at substantially atmospheric pressure enter the system through pipe 1. The gas is warmed to about 130 degrees Fahrenheit in heat exchanger 2 and is compressed to about 125 pounds per square inch absolute by compressor 4, being heated thereby to about 380 degrees Fahrenheit and passing to stabilizer coil 6 at that temperature. In giving up a portion of its heat in coil 6 the gas is cooled to around 285 degrees Fahrenheit and in passing through exchanger 2 and cooler 10 is further cooled to about 100 degrees Fahrenheit and its pressure, due to friction, is reduced to about 120 pounds. Around 3,300,000 cubic feet per day of high pressure wet gas at 120 pounds pressure enters the system through pipe 31 and mixes in pipe 12 with the compressed gas. The mixture passes through exchanger 13 wherein it is cooled to −10 degrees Fahrenheit and about 7% by volume of the total mixture is liquefied. Dry gas is separated from condensate in separator 15 and the dry gas, now at about 110 pounds pressure passes through pipe 16 to engine 17 wherein it expands polytropically to around 20 pounds pressure, driving compressor 4, and in so expanding is cooled to about −120 degrees Fahrenheit. The cold expanded gas exhausts from the engine and passes to heat exchanger 13 where it serves as the cooling medium in cooling the wet gas passing therethrough. The tail gas passes from exchanger 13 to pipe 19 at about atmospheric pressure and is conducted to a torch where it is burned.

The condensate collected in separator 15 is pumped to stabilizer 7 wherein it is stabilized to produce what is known to the trade as 26 pound Reid vapor pressure motor fuel, the stabilizer being operated at a pressure of about 100 pounds per square inch with a bottom temperature of around 200 degrees Fahrenheit.

Numerous modifications of the method of carrying out the invention are possible. The arrangement of the various elements such as heat exchangers, engines, and compressors may be changed in any desirable manner without departing from the scope of this invention. The operation of the engine is fully explained in the copending application cited hereinbefore and in that application it was pointed out that the engine may be of any type suitable to the service. It may be a reciprocating piston engine with any suitable valve gear, and it may be of the single stage or multi-stage type or it may be in the form of a turbine or any other type of engine for converting the expansion of the gas into mechanical work. The compressors may be any desirable type and may be directly connected to the engine or driven through some intermediate means. For example, the engine may drive an electric generator which in turn supplies electric energy for the operation of the compressors.

While the operation of the invention has been described in connection with the recovery of the higher boiling components of natural gas associated with the production of crude petroleum it may equally well be used in connection with gas from gas wells, from gas encountered in the refining of petroleum, such as still gas, gas produced in the cracking or polymerization of petroleum hydrocarbons, and from gas produced in the distillation of coal, shale, and other bitumens, or any other gas containing such liquefiable components.

The examples herein recited are given solely by way of explanation and clarification and the scope of the invention herein disclosed is limited only by the appended claims.

I claim:

1. In the recovery of liquid hydrocarbons from a mixture of the vapors thereof with vapors of more volatile hydrocarbons by expanding a portion of the vapors and utilizing the resulting reduction of temperature to cool the mixture and effect partial condensation thereof prior to said expansion, the steps comprising compressing the mixture by the energy derived from said expansion and passing the compressed mixture in heat exchange relation with the condensate prior to said expansion of the mixture to stabilize the said condensate.

2. In the recovery of liquid hydrocarbons from a mixture of the vapors thereof with vapors of more volatile hydrocarbons by expanding a portion of the vapors and utilizing the resulting reduction of temperature to cool said mixture and effect partial condensation thereof prior to said expansion, the steps comprising compressing the mixture by the energy derived from said expansion and passing the compressed mixture in heat exchange relation with the condensate prior to cooling of the mixture after compression thereof to stabilize the said condensate.

3. In the recovery of liquid hydrocarbons from a mixture of the vapors thereof with vapors of more volatile hydrocarbons by expanding a portion of the vapors and utilizing the resulting reduction of temperature to cool the mixture and effect partial condensation thereof prior to said expansion, the steps comprising compressing the mixture by the energy derived from said expansion and adding wet gas available at similar pressure to the compressed mixture prior to said expansion, and passing the compressed mixture in heat exchange relation with the resulting condensate.

4. In the recovery of liquid hydrocarbons from a mixture of the vapors thereof with vapors of more volatile hydrocarbons by expanding a portion of the vapors and utilizing the resulting reduction of temperature to cool the mixture and effect partial condensation thereof prior to said expansion, the steps comprising compressing the mixture by the energy derived from said expansion and adding wet gas available at similar pressure to the compressed mixture prior to said expansion, and passing the compressed mixture in heat exchange relation with the resulting condensate prior to said admixture of wet gas.

5. In the recovery of liquid hydrocarbons from a mixture of the vapors thereof with vapors of more volatile hydrocarbons by expanding a portion of the vapors and utilizing the resulting reduction of temperature to cool the mixture and effect partial condensation thereof prior to said expansion, the steps comprising compressing the mixture prior to its expansion by the energy derived from said expansion and stabilizing the condensate with heat contained in the compressed mixture prior to said expansion.

6. In the recovery of liquid hydrocarbons from a mixture of the vapors thereof with vapors of more volatile hydrocarbons, the steps comprising compressing the mixture, expanding a portion of the mixture and thereby reducing the temperature thereof, by the reduction of temperature derived from said expansion cooling the mixture and effecting partial condensation thereof prior to said expansion, utilizing the energy of said expansion to effect said compression, and passing the compressed mixture in heat exchange with the resulting condensate to stabilize the latter.

7. In the recovery of liquid hydrocarbons from a mixture of the vapors thereof with vapors of more volatile hydrocarbons, the steps comprising compressing the mixture with consequent temperature increase, passing the compressed gas into indirect heat exchange relation with liquid hydrocarbons undergoing stabilization, then separating condensate from the residual vapor, expanding the residual vapor, utilizing the energy of said expansion to effect said compression, cooling the residual vapor prior to said expansion by the reduction of the temperature derived from said expansion, and passing said condensate to said hydrocarbons undergoing stabilization.

8. In the method according to claim 6 the step of adding wet gas at similar pressure to the compressed mixture before expansion thereof.

9. In the recovery of liquid hydrocarbons from a mixture under pressure of the vapors thereof with vapors of more volatile hydrocarbons the steps comprising cooling the mixture under pressure, separating condensate from the cooled mixture, expanding the residual mixture, utilizing the reduction of temperature of said expansion to effect said cooling, utilizing the energy derived from said expansion to compress to similar pressure wet gas available at lower pressure, passing the compressed wet gas in heat interchange relation with the condensate to effect cooling of the compressed gas, and adding the cooled compressed gas to the mixture passing to the first-named cooling operation.

10. In the recovery of liquid hydrocarbons from a mixture of the vapors thereof with vapors of more volatile hydrocarbons, the steps comprising compressing the mixture, expanding the more volatile portion of the mixture and thereby reducing the temperature thereof prior to said expansion, cooling said compressed mixture by the temperature reduction derived from said expansion and separating resulting condensate therefrom, utilizing the energy of said expansion to effect said compression, and utilizing said cooling and the temperature rise due to said compression to stabilize said condensate.

11. In the recovery of liquid hydrocarbons from a mixture of the vapors thereof with vapors of more volatile hydrocarbons, the steps comprising compressing the mixture, passing the compressed mixture in heat exchange relation with condensate in a lower level of a rectifying zone to stabilize the said condensate and then cooling the compressed mixture, introducing the cooled compressed mixture to an intermediate level of said zone to contact with reflux condensate passing to said lower level, withdrawing vapor from an upper level of said zone, expanding said withdrawn vapor, and passing the expanded vapor in heat exchange relation with the vapor in an upper level of said zone to condense a portion of said vapor to form said reflux condensate passing to said lower level of said rectifying zone to be stabilized.

12. In the recovery of liquid hydrocarbons from a mixture of the vapors thereof with vapors of more volatile hydrocarbons, the steps comprising compressing the mixture, passing the compressed mixture in heat exchange relation with condensate in a lower level of a rectifying zone to stabilize the said condensate and then cooling the compressed mixture, introducing the cooled compressed mixture to an intermediate level of said zone to contact with reflux condensate passing to said lower level, withdrawing vapor from an upper level of said zone, utilizing the pressure energy of said withdrawn vapor to effect said compression and thereby cooling said vapor, and then passing the withdrawn vapor in heat exchange relation with vapor in an upper level of said zone to condense a portion of said vapor to form said reflux condensate passing to said lower level of said rectifying zone to be stabilized.

13. The method of recovering stable motor fuel from wet hydrocarbon gas which comprises compressing wet hydrocarbon gas whereby said gas is heated, passing said heated compressed gas in indirect heat exchange relationship with condensate undergoing stabilization to impart a portion of the heat of said heated compressed gas to said condensate whereby said heated compressed gas is partially cooled, passing said partially cooled compressed gas in indirect heat exchange relationship with cold dry gas to cool said compressed gas and to liquefy the liquefiable components thereof, separating the liquefied portion from the unliquefied portion to form a liquid portion and a dry gas portion, expanding said dry gas to a pressure lower than that of said wet hydrocarbon gas to perform work and to cool said dry gas, said cooled, expanded, dry gas being the cold dry gas in said heat exchange relationship with said partially cooled compressed gas, passing said liquid portion to a stabilizing zone, stabilizing said liquid portion to form the desired stable motor fuel, said liquid portion undergoing stabilization being said first mentioned condensate undergoing stabilization, and expending said work in compressing said wet hydrocarbon gas.

14. The method of recovering stable motor fuel from wet hydrocarbon gas which comprises warming wet hydrocarbon gas, compressing said warmed wet hydrocarbon gas whereby said gas is further heated, passing said heated compressed gas in indirect heat exchange relationship with condensate undergoing stabilization to impart a portion of the heat of said heated gas to said condensate whereby said gas is partially cooled, further cooling said gas, passing said cooled wet gas in indirect heat exchange relationship with cold dry gas to cool further said gas and to liquefy the liquefiable components thereof, separating the liquefied portion from the unliquefied portion to form a liquid portion and a dry gas portion, expanding said dry gas to a pressure lower than that of said wet hydrocarbon gas to perform work and to cool the gas, said cooled expanded dry gas being the cold dry gas in said indirect heat exchange relationship with said cooled wet gas, passing said liquid portion to a stabilizing zone, stabilizing said liquid portion to form the desired motor fuel, said liquid portion undergoing stabilization being said first mentioned condensate undergoing stabilization, and expending said work in compressing said warmed wet hydrocarbon gas.

15. The method of recovering stable motor fuel from wet hydrocarbon gas of which a portion occurs at substantial pressure and another portion occurs at lower pressure which comprises warming a body of wet hydrocarbon gas which occurs at lower pressure, compressing said warmed wet hydrocarbon gas to a pressure substantially equal to that of a second body of wet hydrocarbon gas which occurs at a higher pressure whereby said warmed wet hydrocarbon gas is further heated, passing said heated compressed gas in indirect heat exchange relationship with condensate undergoing stabilization to impart a portion of the heat of said heated compressed gas to said condensate whereby said gas is partially cooled, further cooling said gas, admixing said cooled gas with said second body of wet gas which occurs at a higher pressure, passing said mixture of wet gas in indirect heat exchange relationship with cold dry gas to cool said mixture of wet gas and to liquefy the liquefiable components thereof, separating the liquefied portion from the unliquefied portion to form a liquid portion and a dry gas portion, expanding said dry gas portion to perform work and to cool said dry gas, said cooled dry gas being the cold dry gas in said indirect heat exchange relationship with said mixture of wet gas, passing said liquid portion to a stabilizing zone, stabilizing said liquid portion to form the desired stable motor fuel, said liquid portion undergoing stabilization being said condensate undergoing stabilization, and expending said work in compressing said first mentioned warmed wet hydrocarbon gas.

16. The method of recovering stable motor fuel from wet hydrocarbon gas which comprises compressing wet hyrocarbon gas whereby said gas is heated, passing said heated compressed wet gas in indirect heat exchange relationship with condensate undergoing stabilization to impart a portion of the heat of said heated compressed gas to said condensate whereby said heated compressed gas is partially cooled, further cooling said partially cooled gas, passing said cooled gas to a fractionating zone, counter-currently contacting said gas with reflux condensate, cooling said contacted gas in indirect heat exchange relationship with cold dry gas to liquefy the liquefiable components of said wet gas and to form said reflux condensate, withdrawing the unliquefied portion of said cooled wet gas as dry gas, expanding said dry gas to perform work and to cool said gas to a pressure lower than that of said wet hydrocarbon gas, said expanded cold dry gas being the cold dry gas in said last mentioned indirect heat exchange relationship, passing said reflux condensate to a stabilizing zone to stabilize said reflux condensate to form the desired stable motor fuel, said reflux condensate undergoing stabilization being said first mentioned condensate undergoing stabilization, and expending said work in compressing said wet hydrocarbon gas.

17. The method of recovering stable motor fuel from wet hydrocarbon gas of which a portion occurs at substantial pressure and another portion occurs at lower pressure which comprises warming a body of wet hydrocarbon gas which occurs at lower pressure, compressing said warmed wet gas to a pressure substantially equal to that of a second body of wet gas which occurs at a substantial pressure whereby said warmed wet gas is further heated, passing said heated compressed gas in indirect heat exchange relationship with condensate undergoing stabilization to impart a portion of the heat of said heated compressed gas to said condensate whereby said gas is partially cooled, further cooling said partially cooled gas, admixing said cooled gas with said second body of wet gas which occurs at substantial pressure, passing said mixture of wet gas to a fractionating zone, countercurrently contacting said mixture of wet gas with reflux condensate, cooling said contacted gas mixture in indirect heat exchange relationship with cold dry gas to liquefy the liquefiable components of said gas mixture and to form said reflux condensate, withdrawing the unliquefied portion of said cooled gas mixture as dry gas, expanding said dry gas to perform work and to cool said dry gas, said cold dry gas being the cold dry gas in said indirect heat exchange relationship with said gas mixture, passing said reflux condensate to a stabilizing zone to stabilize said reflux condensate to form the desired stable motor fuel, said reflux condensate undergoing stabilization being said first mentioned condensate undergoing stabilization, and expending said work in compressing said body of warmed wet hydrocarbon gas which occurs at lower pressure.

18. The process of recovering stable motor fuel from wet hydrocarbon gas which comprises compressing wet hydrocarbon gas whereby sensible heat is generated in said wet compressed gas, imparting a portion of said generated heat to a stabilizing zone to stabilize condensate therein whereby said heated compressed wet gas is partially cooled, further cooling said partially cooled compressed gas in indirect heat exchange relationship with cold dry gas to liquefy the liquefiable components of said compressed gas, passing said liquefied components to said stabilizing zone, said liquefied components being said condensate undergoing stabilization, expanding the unliquefied dry gas portion of said cooled compressed gas to perform work and to cool said dry gas, said cold dry gas being the cold dry gas in said indirect heat exchange relationship, and expending said work in compressing said wet hydrocarbon gas.

19. The method of processing wet hydrocarbon gas which comprises compressing wet hydrocarbon gas, imparting a portion of the heat of compression of said compressed wet gas to a condensate stabilizing zone, cooling said compressed wet gas to liquefy higher boiling components thereof, stabilizing said liquefied higher boiling components in said stabilizing zone, expanding the unliquefied dry gas portion of said cooled compressed wet gas to perform work and to cool said dry gas, said expanded cold dry gas being the cooling medium in said cooling of said compressed wet gas, and expending said work in compressing said wet hydrocarbon gas.

OSWALD C. BREWSTER.